United States Patent
Borrelli et al.

(10) Patent No.: US 6,912,087 B1
(45) Date of Patent: Jun. 28, 2005

(54) ULTRA-THIN GLASS POLARIZERS AND METHOD OF MAKING SAME

(75) Inventors: Nicholas F. Borrelli, Elmira, NY (US); David G. Grossman, Corning, NY (US); Larry G. Mann, Painted Post, NY (US); Jeanne M. Mordarski, Albuquerque, NM (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/674,115

(22) PCT Filed: Apr. 6, 1999

(86) PCT No.: PCT/US99/07521
§ 371 (c)(1),
(2), (4) Date: Oct. 24, 2000

(87) PCT Pub. No.: WO99/59006
PCT Pub. Date: Nov. 18, 1999

Related U.S. Application Data
(60) Provisional application No. 60/085,464, filed on May 14, 1998.

(51) Int. Cl.[7] .............................. G02B 5/30; C03C 19/00
(52) U.S. Cl. .......................... 359/492; 359/900; 65/23; 65/30.1; 65/30.11; 65/32.3; 65/32.5; 65/102
(58) Field of Search ................................. 359/485, 489, 359/490, 491, 492, 900; 65/23, 30.11, 30.1, 32.3, 32.5, 102

(56) References Cited

U.S. PATENT DOCUMENTS
4,304,584 A * 12/1981 Borrelli et al.
6,171,762 B1 * 1/2001 Borrelli et al.

FOREIGN PATENT DOCUMENTS
| EP | 0105701 A1 | * | 4/1984 |
| JP | 59-83951 | * | 5/1984 |
| JP | 8-231241 | * | 9/1996 |

* cited by examiner

Primary Examiner—Ricky D. Shafer
(74) Attorney, Agent, or Firm—Vincent Kung

(57) ABSTRACT

A method for making a polarizing glass article is provided. The method includes first providing a precursor glass containing metal-halide particles. The precursor glass may be encased in a gas-permeable medium. Then, form at least a first polarizing layer and a non-polarizing region in the precursor glass. Bond the polarizing layer to a substrate and removing the non-polarizing region to expose the polarizing layer. Then, separate the first polarizing layer from the substrate to produce an ultra-thin polarizing glass article measuring less than or equal to about 200 μm in thickness. The method may further comprise cutting the polarizing layer into wafers.

23 Claims, 2 Drawing Sheets

ULTRA-THIN GLASS POLARIZERS AND METHOD OF MAKING SAME

This application claims the benefit of provisional application Ser. No. 60/085,464 filed May 14, 1998.

FIELD OF THE INVENTION

The invention relates to ultra-thin light polarizing glass articles and a method for making same. In particular, it relates to a novel method for making silver-containing polarizing glass, and ultra-thin polarizing glass articles made from such glass. Specifically, the invention relates to a single layer light polarizing device free of adjacent non-polarizing regions.

BACKGROUND OF THE INVENTION

The use of very thin polarizing devices makes it possible to produce optical components without the need for expensive lens elements and more importantly, lessen alignment problems in order to maintain high light throughput. For any integrated device, the goal is to shorten the optical pathlength in order to decrease diffraction losses. These, and other aspects of vertical integration technology, as it is known, are described by Shiraishi et al., in *Vertical Integration Technology for Fiber-Optic Circuit*, OPTOELECTRONICS, Vol. 10, No. 1, pp.55–74, Mar. 1995.

The closest product of which we are aware, for producing optical isolators of the kind described herein is POLARCOR™, a high quality finished optical component available from Corning Incorporated, Corning, NY. This product is available in planar shapes with dimension up to 30 mm parallel to the major principal transmission direction.

POLARCOR™ products are also available in thickness as low as 0.2 mm.

In addition to POLARCOR™, we are aware of a several patents such as U.S. Pat. Nos. 5,430,573; 5,322,819; 5,300,465; 5,281,562; 5,275,979; 5,045,509; 4,792,535; 4,479,819; JP 4-279337; JP 5-208844; and EP 0 719 741 all of which have described glass articles which are polarizing in the infrared region.

JP 4-279337; JP 5-208844 describe a copper-based polarizing glass which, according to the patent application can measure less than 240 $\mu$m in thickness. However, the examples were limited to glass thickness in the range of 100 to 1000 $\mu$m. The polarizing glass of this patent application was prepared by polishing stretched copper halide-containing glass to a thickness in the range of 1000 to 1000 $\mu$m, and then subjecting the glass to a hydrogen mosphere to form glass.

One disadvantage of the methods described in the above references, at least with respect to making ultra-thin polarizing glass, is the difficulty of handling and processing very thin free-standing glass pieces as required in the instant invention. In this connection, JP[Hei]9-86956 suggests a method for reducing loss due to the high stress used for stretching small crystals embedded in a glass matrix. However, there continues to be a need for improvements in the processes for making thin glass polarizers.

Accordingly, it is the object of the present invention to provide approaches for making ultra-thin polarizing glass articles in which the above difficulties are reduced or eliminated.

SUMMARY OF THE INVENTION

The invention relates to an ultra-thin polarizing glass, unique in that the glass is monolithic and has dispersed across its entire breadth and thickness, elongated submicroscopic metal particles. The metal particles have a long axis such that the glass preferentially absorbs polarizing components of light that is parallel to the long axis to allow high transmittance of light, which vibrates perpendicular to the long axis. The polarizing glass is also unique in that it is essentially free of metal halide particles which tend to impart certain undesirable optical properties to the glass such as photochromic properties, or light scattering caused by the presence of tiny halide crystals embedded in the glass. In another aspect, the invention relates to a method of making ultra-thin polarizing glass.

DETAILED DESCRIPTION OF THE INVENTION

In order to produce polarizing glass articles of the invention measuring less than 200 $\mu$m in thickness, we have developed a process by which polarizing glass can be thinned down to form an ultra-thin polarizing glass measuring even less than 50 $\mu$m in thickness, preferably having a thickness in the range of 10 to 40 $\mu$m.

Figure 1:
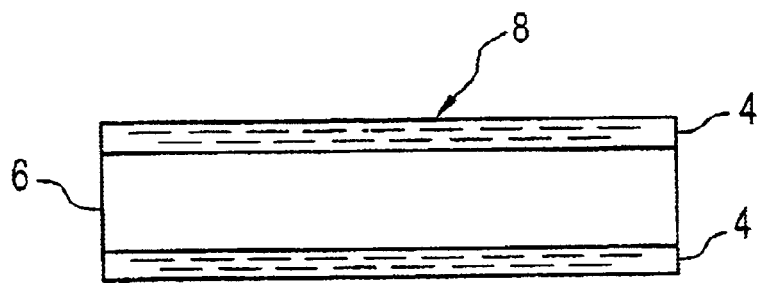
FIG. 1 is a schematic diagram of a POLARCOR™ glass which can be used to produce ultra-thin polarizing glass.
Figure 2:
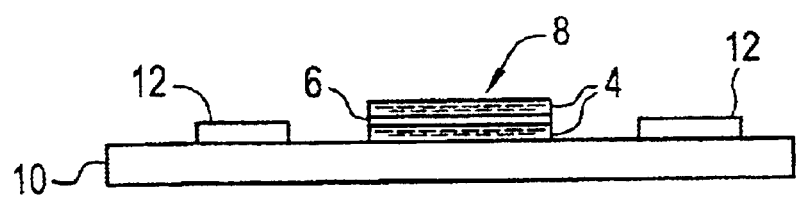
FIG. 2 is a schematic diagram of one embodiment of the inventive method of producing ultra-thin polarizing glass.

In one particularly useful embodiment, the process begins with a piece of POLARCOR™ glass 8 (FIG. 1), having two polarizing glass layers 4, separated by a non-polarizing region 6. The polarizing layers 4 of the glass contain stretched or elongated metal particles, while the nonpolarizing central region contains elongated or stretched metal halide particles. In this embodiment (FIG. 2), to form very thin polarizing glass articles from the POLARCOR™ glass, the glass 8 is first blocked or bonded to a suitable substrate 10 using an appropriate material such as a resin, wax, or a resin/wax mixture. The glass is bonded onto the substrate such that one of the polarizing layers 4 is in abutting contact with the substrate 10. Two cover slips 12 are then placed on either sides of the glass as shown in FIG. 2. The slips, which are optional, serve to protect the edges of the a Am A POLARCOR™ glass during the lapping process.

Other appropriate blocking (bonding) compounds can also be used such as Loctite 412, a cyanoacrylate adhesive available from Locktite Corporation, Rocky Hill, Conn. After bonding the glass to the substrate, the top polarizing layer and the central non-polarizing region are removed, for example, by a single-side lapping process, optionally followed by a polish with a cerium oxide slurry. Then, while the bottom polarizing layer is still bonded to the substrate, the glass is diced (sliced) to obtain thin wafers of polarizing glass having the desired thickness. This dicing step can be done using a high speed precision wafer saw. Optionally, the wafers are further cut or diced to various lengths to obtain desired dimensions. The wafers are then separated and removed from the substrate by dissolving the blocking compound in a suitable solvent such as acetone, optionally finished by polishing, and then cleaned. The step of removing the top polarizing layer and the central nonpolarizing layer can also be done by single-side lapping, chemical thinning, or by a combination of the single-side lapping followed by chemical thinning. Examples of useful chemical thinning techniques include use of suitable chemicals such as acid fluorides or molten sodium hydroxide baths. Using this technique 1 mm ×2mm wafers having a thickness in the range of 1 to 200 µm (preferably less than 100 µm) can be obtained.

Figure 3:
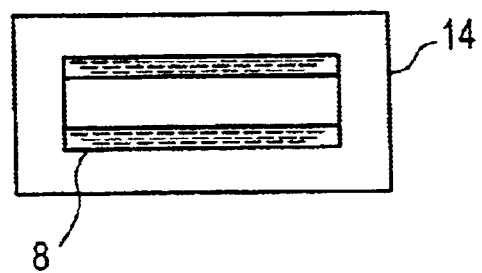
FIG. 3 is a schematic diagram illustrating another embodiment of the inventive method of producing ultra-thin polarizing glass.

In another embodiment (FIG. 3), the POLARCOR™ glass 8 to be thinned is encased in an appropriate medium 14 such as an outer skin glass of the type described in U.S. Pat. No. 4,486,213. In this embodiment, while still encased in the skin glass or other appropriate medium, thin wafers of polarizing glass are then sliced from the two polarizing layers as described above. The advantage of this approach is that the outer skin glass provides additional bulk and stiffness to the piece for ease of handling during the thinning process. The outer skin glass is subsequently removed by any suitable method such as by chemical dissolution.

In another embodiment, glass containing elongated metal halide particles, preferably silver halide particles, is thinned to a desired thickness, preferably in the range of 10 to 50 µm using any of the above dicing and thinning techniques. After dicing and thinning to a desired thickness, the glass is subjected to a reducing gas environment as disclosed in U.S. Pat. Nos. 4,479,819 and 4,908,054, to convert all the silver halide particles to elongated metallic silver particles and to thereby render the glass polarizing.

Figure 4:
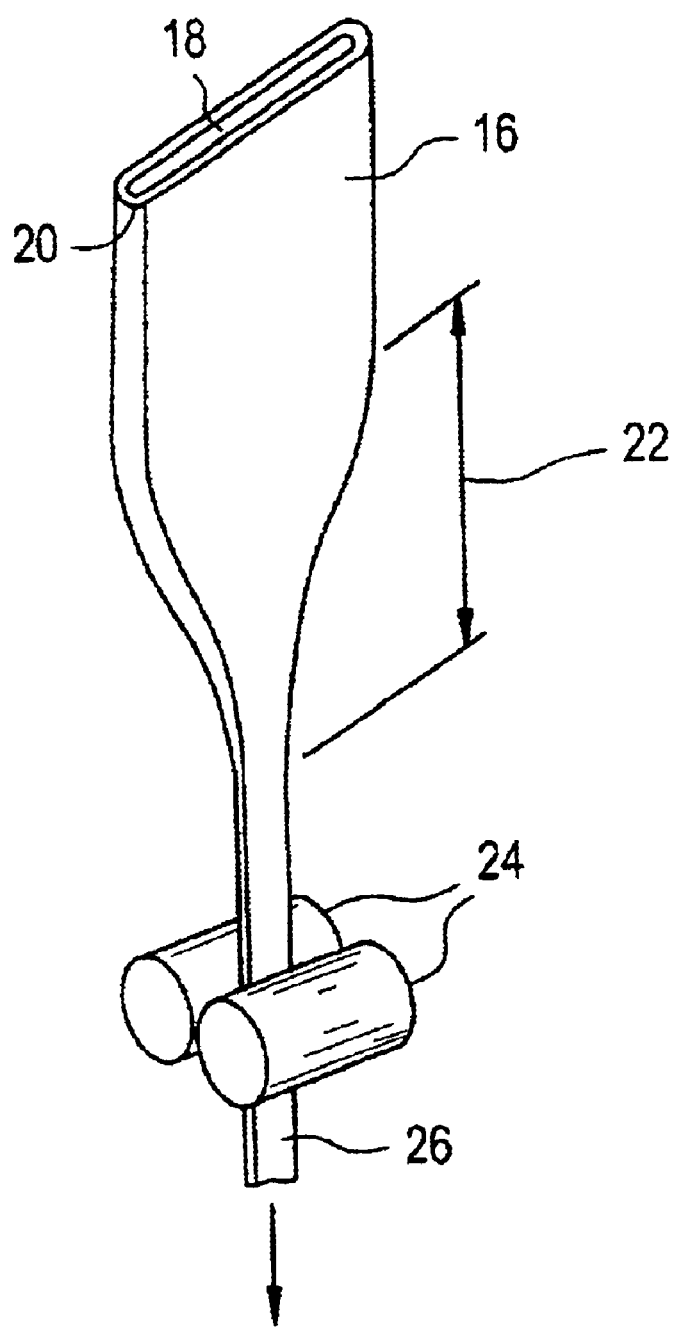
FIG. 4 is a schematic diagram illustrating an embodiment in which metal halide containing glass is processed while encased in an outer skin glass.

In still another embodiment, metal halide-containing glass is first encased in an appropriate medium to form a composite structure. The medium is preferably any gas permeable material which will not react with the glass. A particularly useful example of such a medium is the outer skin glass described in U.S. Pat. No. 4,486,213. The composite structure (i.e., skin glass and metal halide-containing glass) is then co-stretched to form a thin metal halide-containing glass in which the metal halide particles are elongated to a desired aspect ratio, for example, as described in the U.S. Pat. No. 4,486,213 (herein incorporated by reference). FIG. 4 illustrates one practical method of stretching the metal halide particles. As shown in FIG. 4, the composite structure 16 is shown comprising the metal halide containing glass 18 and a skin glass 20. The composite structure 16 passes through a hot zone of a redraw furnace represented by arrow 22, wherein the composite structure is heated and stretched under tension by pulling rolls 24 to form a stretched composite structure 26.

The stretched structure is then exposed to a reducing gas atmosphere to reduce the elongated metal halide particles and thereby form glass containing elongated metal particles. The structure can then be sliced as described herein to form very thin slices of polarizing glass 8 encased in skin glass. The skin glass can be removed by any appropriate method to expose the stretched polarizing glass. For example, the skin glass can be washed away using a suitable solvent.

In this embodiment, the metal halide containing glass can be encased in the skin glass either after it has been formed and hardened, or in molten form while both the skin glass and the metal halide containing glass are being discharged from a separate glass feeders such as described in U.S. Pat. No. 3,582,306, or laminated glass sheet formers as described in U.S. Pat. No. 4,204,027 and 4,214,886.

In still a further embodiment, metal halide-containing glass is first stretched to form elongated metal-halide particles having desired aspect ratios prior to encasement in a skin glass. After encasement, the structure is then exposed to a reducing gas environment to reduce the metal halide particles and form polarizing glass containing elongated metal particles.

After the reducing step the glass containing elongated metal particles can then be thinned into desired a thickness using methods described herein.

EXAMPLES

The following example describes one preferred method for making polarizing glass having a thickness less than 100 µm, preferably, less than 50 µm, and most preferably, in the range of 10 to 40m. The POLARCOR™ glass article used in the following example can be either a two-layer (a polarizing and a non-polarizing layer) or three-layer glass (a polarizing layer sandwiched between two non-polarizing layers).

1) measure and record the thickness of a glass slide and a POLARCOR™ piece using a metric micrometer;
2) place the glass slide, POLARCOR™ piece, and cover slips on a hot plate pre-set at a low temperature to allow the pieces to warm up;
3) smear some thermal set "rosin" on the glass slide and allow the rosin to melt; when melted, place the glass piece of POLARCOR™ on the rosin, place a cover slip on each side of the piece (Figure), and remove the slide from the hot plate to allow the glass to cool; and
4) measure the thickness of the glass slide and POLARCOR™ piece together, and subtract from this the initial-thickness of the glass slide and POLARCOR™, to obtain the thickness of the rosin (smear) in order to determine the thickness of the POLARCOR™ during the thinning process;
5) after the slide has cooled sufficiently for further processing, place the slide on a thinning apparatus such as a Buehler Petro-thin unit (available from Buehler, Ltd., Lake Bluff, Ill.), and remove by grinding for example, the top portions of the POLARCOR™ piece until about 100 micron thickness is remaining;
6) remove the slide from the unit and measure the thickness of the slide and POLARCOR™ piece using a micrometer; from this number subtract the thickness of the slide and the thickness of the rosin later to obtain the amount of POLARCOR™ material remaining;
7) grind down the POLARCOR™ to remove enough of the top portions of the piece to obtain a very thin piece of material measuring about 20–50 µm. The grind and measure steps are repeated until the desired thickness is obtained.
8) Polish to obtain an ultra-thin polarizing glass piece. Any known polishing medium can be used for this process such as a cerium oxide polishing wheel.

In other experiments, using the methods described above, we have produced several batches of polarizing glass articles having a mean thickness as low as 10 µm after polishing.

To evaluate the optical performance of the glass polarizers of the invention, several samples 15×15 mm square, having thicknesses in the range of 27 to 34 µm as measured with an optical microscope, were tested by measuring the transmission and contrast ratio of the wafers. With the wafers still mounted on the substrate, measured transmission was about 90%, while contrast ratio was in the range of 3124 to 3514, at a wavelength of 1510–1590 nm. Extinction ratios measured for these samples ranged between 29 and 31 dB.

As contemplated herein, the grinding step can be accomplished in one step, or in a series of steps. For example, an initial grinding step can be done using a 1200 grit grinding wheel in order to reduce the thickness to within a first approximation of the desired thickness, followed by a second grinding step using a 2400 grit grinding wheel to obtain the final desired thickness to within the actual specifications.

In the above illustration, it will be observed that one of the original surfaces of the POLARCOR™ piece, the side that is in contact with the slide, has been preserved throughout the entire grinding process. The final step in producing an ultra-thin polarizing glass is to disengage the polarizing glass piece from the slide using any known process. We have found the use of a solvent (e.g., methylene chloride) in and ultrasonic bath to be particularly useful for this purpose.

It should be understood that the foregoing represents illustrative embodiments of the invention, and is not intended to embody all aspects of the invention. In addition to the above embodiments, it will be clear to persons skilled in the art that numerous modifications and changes can be made to the illustrative embodiments without departing from the intended spirit and scope of the invention.

What is claimed is:

1. A method of making an ultra-thin polarizing glass article, the method comprises the steps of:
    a) providing a precursor glass comprising a first polarizing layer containing elongated metal particles, and a non-polarizing region containing metal-halide particles;
    b) bonding said first polarizing layer to a substrate;
    c) removing said non-polarizing region to expose said first polarizing layer; and,
    d) separating said first polarizing layer from said substrate to form a polarizing glass article measuring less than or equal to about 200 $\mu$m in thickness.

2. The method according to claim 1, wherein a single-sided lapping process is used to remove said non-polarizing region.

3. The method according to claim 1, wherein a combination comprising a single-sided lapping process followed by a chemical thinning process is used to remove said non-polarizing region.

4. The method according to claim 1, further comprising polishing said first polarizing layer.

5. The method according to claim 1, further comprising cutting said first polarizing layer into wafers.

6. The method according to claim 5, wherein said cutting step is prior to separating said first polarizing layer from said substrate.

7. The method according to claim 1, wherein said first polarizing layer is essentially free of metal-halide particles.

8. The method according to claim 1, wherein said polarizing glass article has a thickness in the range of about 1 $\mu$m to about 100 $\mu$m.

9. The method according to claim 1, wherein said polarizing glass article has a thickness in the range of about 5 $\mu$m to about 50 $\mu$m.

10. The method according to claim 1, wherein said precursor glass further comprises a second polarizing layer, such that said non-polarizing region is sandwiched between said first and second polarizing layers.

11. The method according to claim 10, wherein after bonding said precursor glass to said substrate, both said second polarizing layer and said non-polarizing region are removed to expose said first polarizing layer.

12. The method according to claim 11, wherein both said first and second polarizing regions contain elongated metal particles.

13. A The method according to claim 1, wherein said elongated metal particles have a long axis, characterized in that said elongated metal particles preferentially absorb a polarized component of light that is parallel to said long axis, and allows transmission of light that is perpendicular to said long axis.

14. The method according to claim 1, wherein said metal particles include silver.

15. The method according to claim 1, wherein said precursor glass contains elongated silver halide particles and was subject to a hydrogen environment to reduce at least a portion of said silver halide particles to metal particles.

16. A polarizing glass article made according to the method of claim 1,

17. The polarizing glass article according to claim 16, wherein said polarizing glass article is characterized as exhibiting an extinction ratio greater than 25 dB in a wavelength greater than about 1500 $\mu$m.

18. A method of making a polarizing glass, the method comprising:
    a) performing the step of either (i) encasing a metal halide-containing precursor glass in a gas-permeable medium to form a composite structure followed by (ii) stretching the composite structure to elongate said metal halide particles, or vice versa; b) exposing the stretched composite structure to a reducing gas atmosphere to reduce at least a portion of the elongated metal halide particles to metal particles to form a polarizing layer; c) slicing said composite structure into wafers of medium encased polarizing glass having said polarizing layer and a non-polarizing region attached thereto; d) bonding said polarizing layer to a substrate; e) removing said non-polarizing region to expose said polarizing layer; and, f) separating said polarizing layer from said substrate to form a polarizing glass article measuring less than or equal to about 200 $\mu$m in thickness.

19. The method according to claim 18, wherein said removing step (e) comprises grinding away said non-polarizing region to a predetermined thickness.

20. The method according to claim 18, further comprising removing said gas permeable medium.

21. A The method according to claim 18, further comprising polishing said polarizing glass article.

22. The method according to claim 18, wherein said polarizing glass article has a thickness in the range of about 1 $\mu$m to about 100 $\mu$m.

23. The method according to claim 18, wherein said polarizing glass article has a thickness in the range of about 5 $\mu$m to about 50 $\mu$m.

* * * * *

UNITED STATES PATENT AND TRADEMARK OFFICE
CERTIFICATE OF CORRECTION

PATENT NO. : 6,912,087 B1
APPLICATION NO. : 09/674115
DATED : June 28, 2005
INVENTOR(S) : Nicholas Francis Borrelli et al.

It is certified that error appears in the above-identified patent and that said Letters Patent is hereby corrected as shown below:

On the Title Page item (75)   Add said inventor Kenjiro Hasui, Shizuoka, Japan

Signed and Sealed this

Twenty-seventh Day of January, 2009

JOHN DOLL
*Acting Director of the United States Patent and Trademark Office*